July 29, 1930.   S. HARRIS   1,771,958
BIT BRACE
Filed July 11, 1929
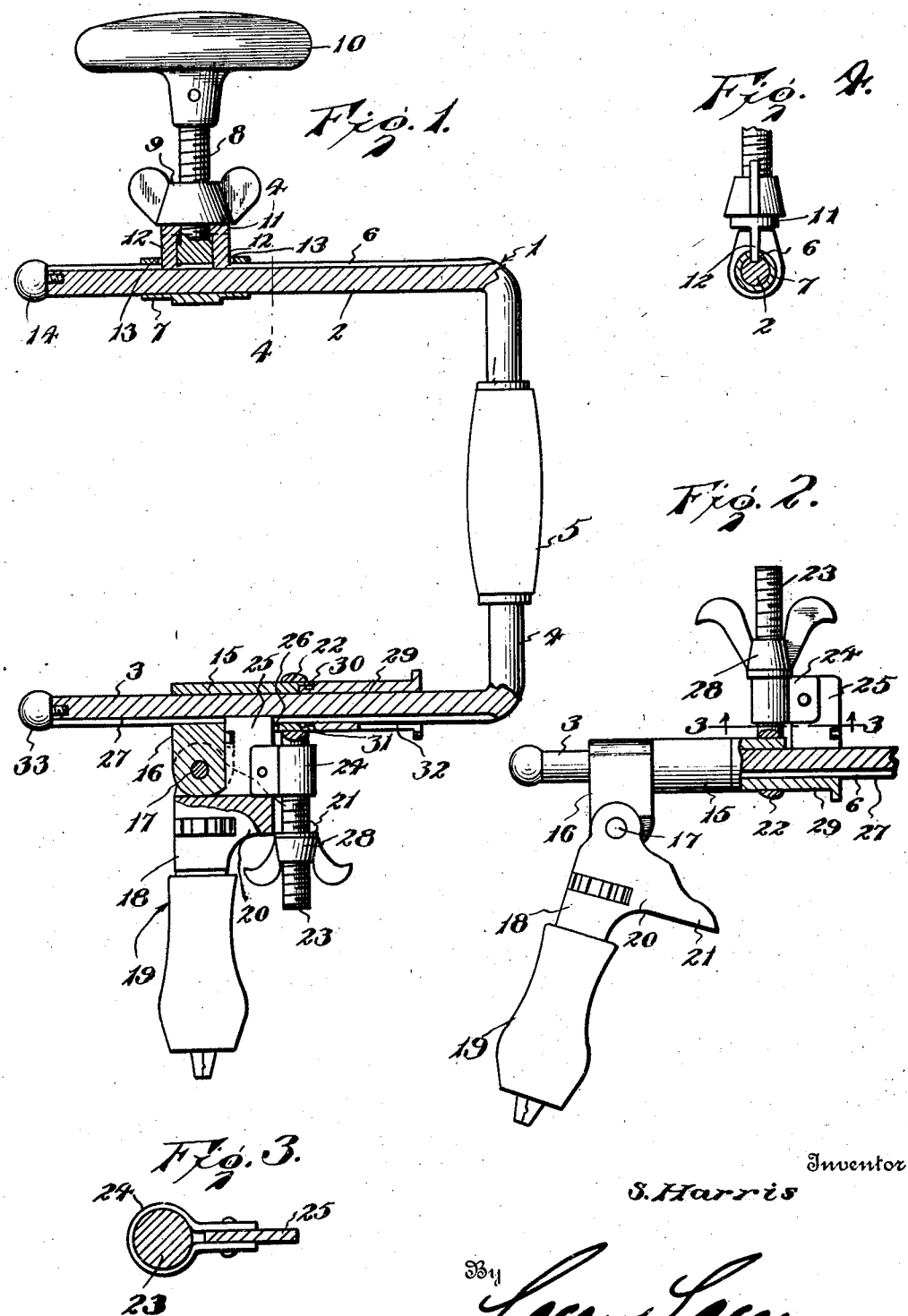
Inventor
S. Harris
By Lacey & Lacey, Attorneys Patented July 29, 1930

1,771,958

UNITED STATES PATENT OFFICE

SAMUEL HARRIS, OF BRUCE ROCK, AUSTRALIA

BIT BRACE

Application filed July 11, 1929. Serial No. 377,525.

The present invention is directed to improvements in bit braces.

The primary object of the invention is to provide a device of this character so constructed that the chuck and hand rest can be easily and quickly adjusted upon the crank in order that various leverages may be obtained.

Another object of the invention is to provide a device of this character so constructed that the various parts can be conveniently assembled, and when in assembled relationship, can be quickly clamped firmly in adjusted position.

Another object of the invention is to provide a device of this character so constructed that the bit chuck can be adjusted to permit universal movement thereof.

Another object of the invention is to provide a device of this nature which is simple in construction, efficient in operation, durable, and one which can be manufactured at a small cost.

With these and other objects in view, this invention resides in the novel features of construction, formation, combination and arrangement of parts to be hereinafter more fully described, claimed and illustrated in the accompanying drawing, in which:

Figure 1 is a side view of this device, partly in section.

Figure 2 is a fragmentary view showing the device adjusted to permit universal movement of the chuck.

Figure 3 is a sectional view on the line 3—3 of Figure 2.

Figure 4 is a sectional view on the line 4—4 of Figure 1.

Referring to the drawing, 1 designates a crank which includes the spaced parallel bars 2 and 3 and a vertical connecting bar 4, there being a hand grip 5 upon the latter bar as is customary.

The bar 2 is provided with a longitudinal groove 6 and slidable on said bar is a sleeve 7 which has integrally formed thereon a screw 8 upon which is threaded a wing nut 9, said screw having a hand rest 10 swiveled thereon, as usual.

Slidable on the screw 8 is a collar 11 from which extends a pair of fingers 12 adapted to enter the slots 13 formed in the sleeve 7 upon opposite sides of the screw 8. These fingers extend into the groove 6 and since the nut can be impinged upon the collar, the fingers will bindingly engage in said groove to hold the sleeve 7 in adjusted position upon the bar 2. A cap 14 is screwed on the free end of the bar 2 to prevent accidental disengagement of the sleeve therefrom.

The bar 3 has slidable thereon a sleeve 15 having a lateral post 16 carried by one end, to which is pivoted by the pin 17 a head 18 which carries the chuck 19. The head 18 is provided with a lateral extension 20 having furcations 21, the purpose of which will be later explained. A ring 22 is rotatably mounted on the sleeve 15 and has a threaded shank 23 formed integral therewith and upon which is slidable a sheet metal bracket 24 which rigidly supports the locking plate 25, said plate being adapted to enter the slot 26 of the sleeve for engagement in the longitudinal groove 27 formed in the bar 3 in order that the plate may be manipulated to firmly lock the sleeve in adjusted position upon the bar 3.

The shank 23 is engaged between the furcations 21 and has threaded thereon a wing nut 28.

A collar 29 is employed and slides upon the bar 3, said collar having a lug 30 for rotatably engaging the annular groove 31 formed in the adjacent end of the sleeve 15. In this manner, the sleeve and collar are rotatably interlocked, it being, of course, understood that the lug is engaged in the groove before the collar and sleeve are slipped upon the bar 3. The collar has a longitudinal slot 32 formed therein for slidably receiving the locking plate 25, when desired. A cap 33 is secured upon the outer end of the bar 3 to prevent accidental disengagement of the sleeve 15 therefrom.

As shown in Figure 1 of the drawing, the nut 9 is impinged against the collar 11 in order that the fingers 12 will be bindingly engaged in the groove 6, thus holding the hand rest in adjusted position upon the bar 2. It will also be observed that the nut 28 is engaged with the furcations 21 which hold the extension 20 engaged with the locking plate 25, and upon feeding the nut 28 inwardly, the bracket 24 will slide whereupon the plate 25 will be forced into binding engagement in the groove 27, thus holding the sleeve 15 in adjusted position upon the bar 3. Obviously, when the nut 28 is in binding engagement with the furcations 21, pivotal movement of the head 18 is prevented.

In Figure 2, the chuck is shown in a position to permit universal movement and with that adjustment the ring 22 has been slipped from the sleeve 15 and upon the collar 29, thus permitting the sleeve 15 to rotate on the bar 3 and permit the head 18 to swing upon the pin 17, universal movement being in this manner obtained. Obviously, when in this position, the nut 28, when screwed inwardly, will engage the bracket 24, thus forcing the plate 25 into engagement with the bar to hold the sleeve 29 firmly secured to the bar 3. Owing to the presence of the lug 30, the sleeve 15 will be held against endwise movement when the sleeve 29 is secured but will be permitted to rotate upon the bar.

From the foregoing, it is thought that the construction, operation, and many advantages of the herein described invention will be apparent to those skilled in the art, without further description, and it will be understood that various changes in the size, shape, proportion, and minor details of construction may be resorted to without departing from the spirit or sacrificing any of the advantages of the invention.

What is claimed is:

1. The combination with a bar of a brace crank, of a sleeve slidably and rotatably mounted thereon, a chuck pivotally connected with the sleeve, a shank connected with the sleeve, a locking plate slidably connected with the shank, and means for sliding the plate into binding engagement with the bar.

2. The combination with a bar of a brace crank, of a sleeve slidably and rotatably mounted thereon, a head pivotally connected with the sleeve having a chuck carried thereby, an extension carried by the head, a shank pivotally connected with the sleeve, a locking plate slidably connected with the shank, and means on the shank for actuating the extension to move the plate into binding engagement with the bar.

3. The combination with a bar of a brace crank, of a sleeve slidably and rotatably mounted thereon, a head pivotally connected with the sleeve, an extension carried by the head, a chuck carried by the head, a ring rotatably engaged on the sleeve and having a shank, a locking plate slidably connected with the shank, cooperative means carried by the shank and extension for sliding the locking plate into binding engagement with the bar.

4. The combination with a bar of a brace crank, of a sleeve slidably and rotatably mounted thereon, said sleeve having a slot formed therein, a collar slidable on the bar and rotatably interlocked with the sleeve, said collar having a slot therein, a head pivotally connected with the sleeve, a chuck carried by the head, said head having an extension, a shank slidably and pivotally engaged with the sleeve and collar, a locking plate slidably and rotatably connected with the shank, means on the shank, for actuating the extention to move the locking plate in the slot of the sleeve to bindingly engage the bar, said means being operable to move the locking plate in the slot of the collar for bindingly engaging the bar when disengaged from the extension to permit free pivotal movement of the chuck.

5. The combination with a bar of a brace crank, of a sleeve slidably and rotatably mounted on the bar, a collar rotatable on the bar and rotatably interlocked with the sleeve, said sleeve and collar having slots therein, a chuck pivotally connected with the sleeve, a ring slidably and rotatably engaged with the sleeve and collar, a shank carried by the ring, a locking plate slidably and rotatably connected with the shank and interchangeably engageable in the slots of the sleeve and collar, and means carried by the shank for moving the locking plate into binding engagement with the bar when engaged in the slot of the sleeve or collar.

In testimony whereof I affix my signature.

SAMUEL HARRIS. [L. S.]